United States Patent [19]

Kobayashi

[11] Patent Number: 5,740,478

[45] Date of Patent: Apr. 14, 1998

[54] CAMERA HAVING AUTOFOCUS APPARATUS

[75] Inventor: Ryuichi Kobayashi, Tokyo, Japan

[73] Assignee: Canon Kabushiki Kaisha, Tokyo, Japan

[21] Appl. No.: 749,154

[22] Filed: Nov. 14, 1996

Related U.S. Application Data

[63] Continuation of Ser. No. 350,098, Nov. 29, 1994, abandoned.

[30] Foreign Application Priority Data

Dec. 1, 1993 [JP] Japan ................ 5-301673

[51] Int. Cl.$^6$ ................ G03B 3/10; G03B 7/099
[52] U.S. Cl. ................ 396/121; 396/271; 396/287
[58] Field of Search ................ 396/121–124, 396/271, 287

[56] References Cited

U.S. PATENT DOCUMENTS

| | | | |
|---|---|---|---|
| 4,441,801 | 4/1984 | Mahhimo et al. | 354/173.11 |
| 4,887,117 | 12/1989 | Kobayashi | 354/400 |
| 5,128,705 | 7/1992 | Someya et al. | 354/400 |
| 5,138,357 | 8/1992 | Utagawa | 354/402 |
| 5,258,795 | 11/1993 | Lucas | 354/289.12 |
| 5,561,492 | 10/1996 | Ohsawa | 396/56 |

FOREIGN PATENT DOCUMENTS

| | | |
|---|---|---|
| 55-118019 | 9/1980 | Japan. |
| 55-155331 | 12/1980 | Japan. |
| 1-120518 | 5/1989 | Japan. |

OTHER PUBLICATIONS

Popular Photography, Dec. 1992, vol. 99, No. 12, p. 57.

*Primary Examiner*—Safet Metjahic
*Assistant Examiner*—Eric Nelson
*Attorney, Agent, or Firm*—Fitzpatrick, Cella, Harper & Scinto

[57] ABSTRACT

A camera having an autofocus apparatus for multi-spot focus detection. Particularly, a camera is provided in such an arrangement that selection operation members for selecting an arbitrary area from a plurality of focus detection areas by a manual operation are provided at positions where a photographer can operate it readily with a finger while holding the camera in a lateral posture or in a vertical posture and that selection information selected through one operation member out of the above two operation members depending upon a holding condition of the camera, is validated, thereby improving the operability.

7 Claims, 7 Drawing Sheets

CAMERA HAVING AUTOFOCUS APPARATUS

This application is a continuation of application Ser. No. 08/350,098, filed Nov. 29, 1994, now abandoned.

BACKGROUND OF THE INVENTION

1. Field of the Invention

The present invention relates to a multi-spot focus detecting apparatus and, more particularly, to a method for selecting a focus detecting point in the multi-spot focus detecting apparatus.

2. Description of the Related Art

There is a conventionally known type of focus detecting apparatus for cameras in which the exit pupil of a taking lens is divided into areas, two images are formed by beams passing through each pupil area, and a change of relative position between the two images is observed to determine a focus state. For example, Japanese Laid-open Patent Applications No. 55-118019 and No. 55-155331 disclose the secondary image forming method in which two secondary image forming optical systems arranged in parallel form two aerial images on an intended focus plane (which is a plane corresponding to a film surface) and the two aerial images are guided onto two sensor surfaces to detect a change of relative position between the two images.

Also, Japanese Patent Application No. 62-279835 discloses a focus detecting apparatus using a plurality of the above focus detecting apparatus and devised to permit focus detection at a position other than the center of a distance measuring plane.

For focus detection with a plurality of focus detecting points (hereinafter referred to as distance measuring points) in the image plane, it is necessary to determine which distance measuring point (focus detecting area) should be used for focusing.

Taking this point into account, a selection method is proposed in which a member is provided for separately selecting each of distance measuring points (focus detecting areas).

SUMMARY OF THE INVENTION

One aspect of the application is to provide a camera in which a distance measuring point (focus detection area) can be readily selected even when the camera is held in a lateral posture or in a vertical posture.

Another aspect of the application is, based on the above object, to provide a camera in which selection operation members for selecting a distance measuring point (focus detection area) are provided each at a position where a photographer's finger is located when the camera is held in the lateral posture or in the vertical posture.

Yet another aspect of the application is, based on the above object, to provide a camera improved in operability by providing selecting means for validating either one of the above selection operation members for vertical posture and lateral posture depending upon a holding state of the camera. Other objects of the invention will be apparent from the embodiments described below with reference to the drawings.

DESCRIPTION OF THE PREFERRED EMBODIMENTS

An embodiment of a multi-spot distance measuring apparatus to which the present invention is applied will be described in detail with reference to the drawings.

Figure 1:
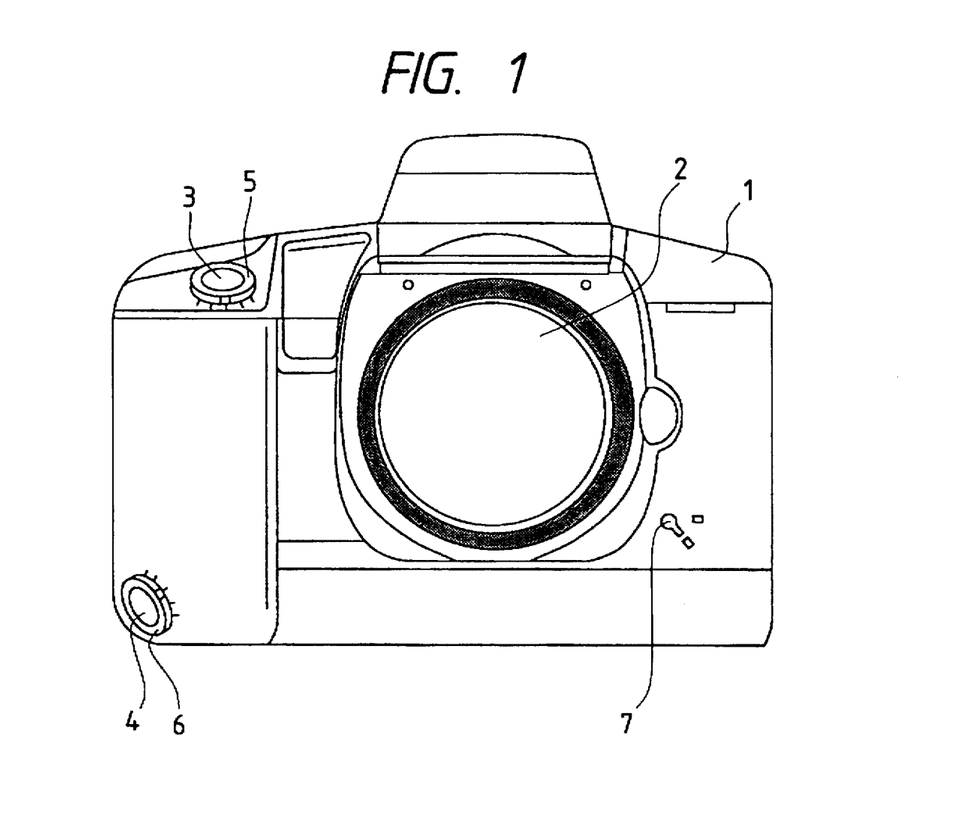
FIG. 1 is a front view of a camera for carrying out the present invention.

FIG. 1 is a drawing to show an appearance of a camera suitable for carrying out the present invention. Reference numeral 1 designates a camera main body, 2 an interchangeable lens detachably mounted thereon, 3 a release button to be operated in shooting in the lateral posture, 4 a release button to be operated in shooting in the vertical posture, 5 a dial for selecting one of distance measuring points in shooting in the lateral posture, 6 a dial for selecting one of distance measuring points in shooting in the vertical posture, and 7 a switch for changeover between automatic selection and manual selection of a distance measuring point.

Figure 2:
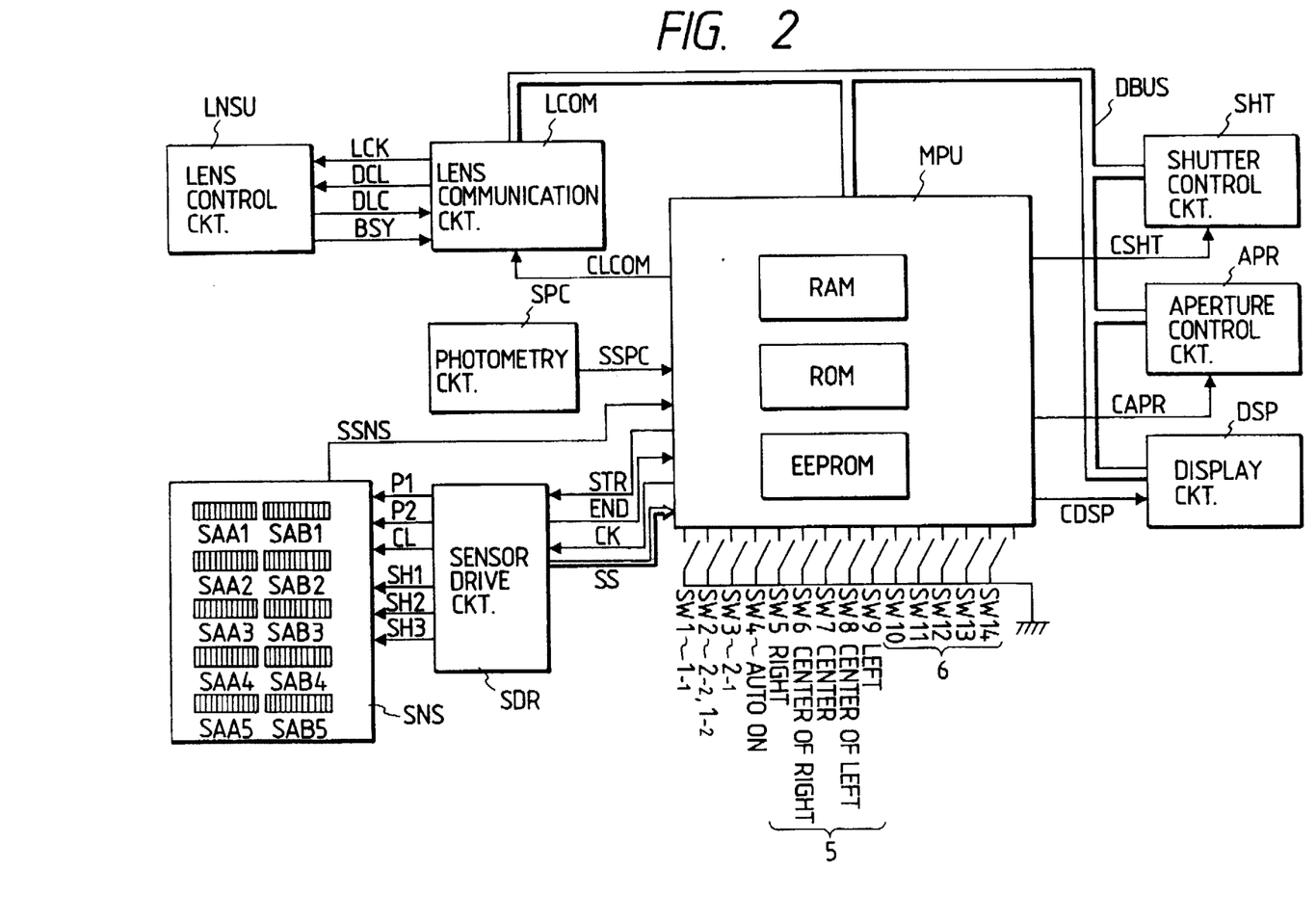
FIG. 2 is a circuit diagram of a first embodiment of the present invention.

FIG. 2 is a block diagram to show an example of the focus detecting apparatus in the camera suitable for carrying out the present invention. MPU denotes a control apparatus of the camera, which is, for example, a one-chip microcomputer in which RAM, ROM, EEPROM (electrically erasable, programmable ROM), and I/O ports, etc. are arranged. The ROM and EEPROM store a series of software and parameters for controlling the camera, including various correction data. DBUS is a data bus, SHT a shutter control circuit for receiving input data through the data bus DBUS during input of a control signal CSHT from the control circuit MPU and controlling running of an unrepresented forward shutter and rearward shutter, based on the thus received data, APR an aperture control circuit for receiving input data through the data bus DBUS during input of a control signal CAPR and controlling an unrepresented aperture mechanism, based on the thus received data, DSP a display circuit for receiving input data through the data bus DBUS during input of a control signal CDSP and displaying a variety of photographic information, based on the thus received data, and SPC a photometry circuit, an output of which is an analog photometry signal SSPC which is sent to the control circuit MPU and then is converted into a digital signal by the circuit MPU to be used as photometry data for controlling the aperture control circuit APR.

LCOM is a lens communication circuit for receiving input data through the data bus DBUS during input of a control signal CLCOM and performing serial communication with a lens control circuit LNSU, based on the thus received data, which is arranged to transmit lens drive data DCL to the lens control circuit LNSU in synchronization with a clock signal LCK and also to serially receive lens information DLC at the same time therewith. BSY is a signal for informing the camera that an unrepresented focusing lens is in motion, and the above serial communication is not performed while this signal is generated.

SW1 is a switch which is turned on by a first stroke of the release button 3 to start AF (autofocus) and photometry.

SW2 is a switch for starting an exposure control by a second stroke of the release button 3, which is arranged also to be turned on by a second stroke of the release button 4.

SW3 is a switch which is turned on by a first stroke of the release button 4.

SW4 is a switch, synchronized with the changeover switch 7 between automatic selection and arbitrary selection, which is arranged to be turned on when the automatic selection is selected. SW5 to SW9 are switches synchronized with the distance measuring point selecting dial 5, which are arranged as follows: only SW5 is on and the other switches are off with selection of a right eye (rightmost distance measuring point (focus detection area)); only SW6 is on with selection of a right middle eye (distance measuring point (focus detection area) between the rightmost point and the center point); only SW7 is on with selection of a center eye (center distance measuring point (focus detection area)); only SW8 is on with selection of a left middle eye (distance measuring point (focus detection area) between the leftmost point and the center point); only SW9 is on with selection of a left eye (leftmost distance measuring point (focus detection area)).

SW10 to SW14 are switches similarly synchronized with the distance measuring point selecting dial 6, which are arranged as follows: only SW10 is on with the right eye; only SW11 is on with the right middle eye; and so on, as only one switch is on in order.

SNS is a line sensor, for example, such as a CCD, having five pairs of sensor arrays (SAA1, SAB1) to (SAA5, SAB5), and SDR is a sensor drive circuit, which controls the line sensor SNS by respective signals supplied from the control circuit MPU.

When the control circuit MPU sends a storage start signal STR to the sensor drive circuit SDR, the sensor drive circuit SDR outputs a clear signal CL to the line sensor SNS to clear charges in all photoelectric conversion portions in the sensor arrays (SAA1, SAB1) to (SAA5, SAB5). Then the line sensor SNS starts a photoelectric conversion and charge storage operation of an optical image formed on the sensor arrays (SAA1, SAB1) to (SAA5, SAB5) by an unrepresented secondary imaging lens set before it. A storage time of the sensor is controlled by the sensor drive circuit SDR. After completion of the sensor storage, the sensor drive circuit SDR supplies a transfer signal SH for a sensor having finished the storage to the line sensor SNS. The transfer signal SH triggers transfer of charge stored in a photoelectric conversion portion in the line sensor SNS to a CCD portion. At the same time, the sensor drive circuit SDR supplies a storage end signal END and an identification signal SS for the sensors having finished the storage to the control circuit MPU, and waits for input of CCD drive clock CK from the control circuit MPU. With input of CCD drive clock CK, the sensor drive circuit SDR produces CCD drive signals $\phi_1$, $\phi_2$ o output the signals to the line sensor SNS. With input of CCD drive signals $\phi_1$, $\phi_2$, the line sensor SNS outputs an analog image signal SSNS to the control circuit MPU in accordance with the signals. By this, the control circuit MPU converts the analog image signal SSNS into a digital signal in synchronization with the CCDE drive clock CK to store a pair of image signals at an address in RAM.

Figure 3:
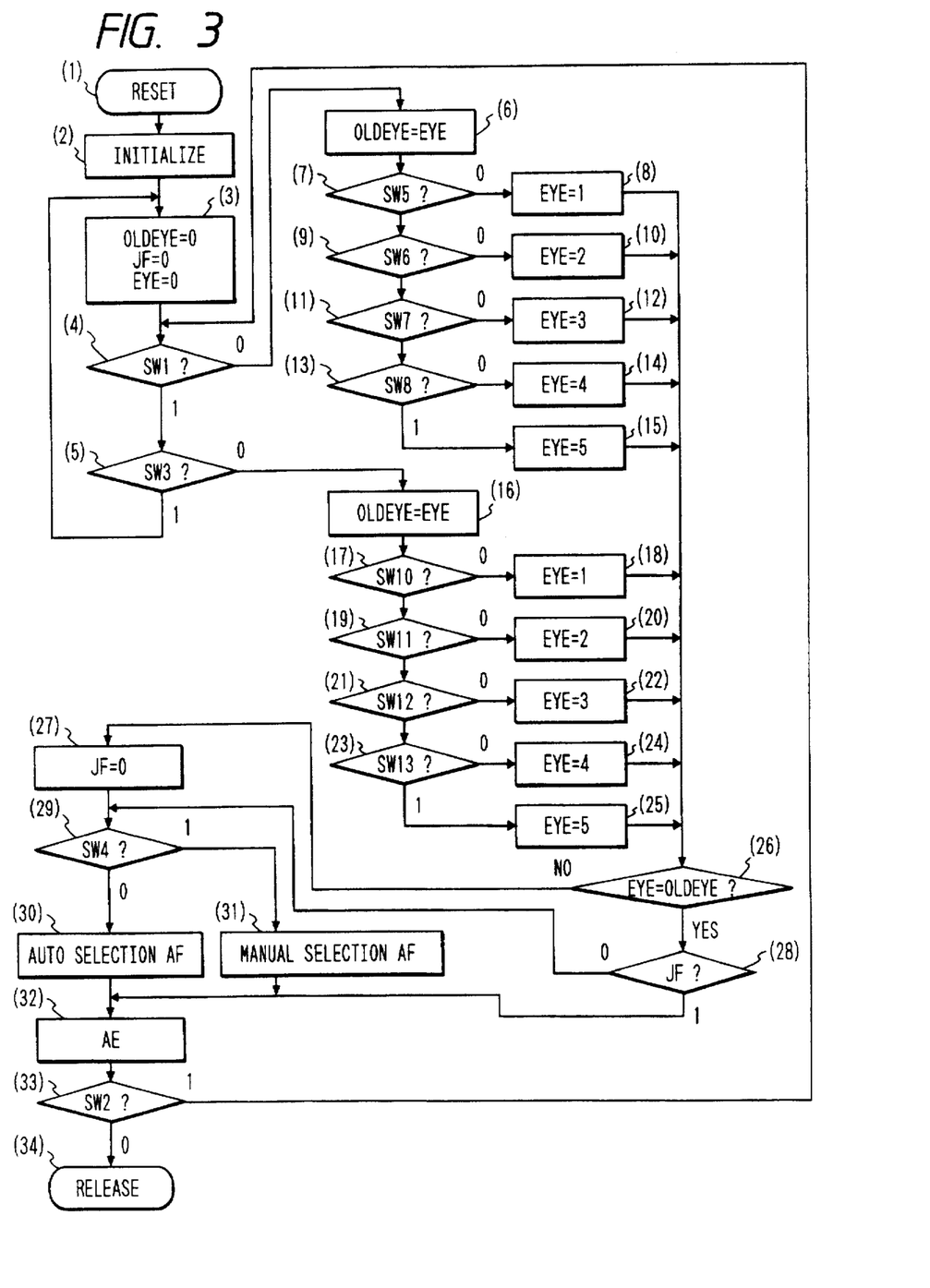
FIG. 3 is a flowchart of the first embodiment of the present invention.

FIG. 3 is a flowchart to illustrate the operation of the present embodiment. When power is supplied from an unrepresented power supply, the micro processor MPU is reset to start the control from (1).

(1) Reset.

(2) Initial settings: to initialize the inner RAM etc. in the micro processor MPU.

(3) To clear registers for storage of distance measuring point (focus detection area) EYE, OLDEYE, and a focusing flag JF.

(4) To determine if the release button 3 is on. If it is on, the flow goes to (6); if not, then the flow branches to (5).

(5) To determine if the release button 4 is on. If it is on, the flow goes to (16); if not, the flow branches to (3).

If neither of the release buttons is turned on, the flow is kept in a loop of from 3 to 5, thus starting no operation.

Here, supposing a photographer holds the camera in the lateral posture, the photographer's forefinger is naturally put on the release button 3. When the photographer lightly presses the release button 3, the flow branches at (4) to (6).

(6) To shift a value of the register EYE to OLDEYE. Since 0 was put in the register EYE at (3), 0 is set in OLDEYE.

(7) To determine if the switch SW5 is on. That is, it is determined if the right eye is selected through the distance measuring point selecting dial 5. If it is on then the flow branches to (8).

(8) To store 1 in the register EYE.

(9) Similarly, to branch to (10), when SW6 is on with selection of the right middle eye.

(10) To store 2 in the register EYE.

(11) To branch to (12), when SW7 is on with selection of the center eye.

(12) To store 3 in the register EYE.

(13) To branch to (14), when SW8 is on with selection of the left middle eye.

(14) To store 4 in the register EYE.

(15) To store 5 in the register EYE at (15) with selection of the left eye.

As described, a value selected by the distance measuring point selecting dial 5 is stored in the register EYE in such a manner that 1 is set upon selection of the right eye, 2 upon selection of the right middle eye, 3 upon selection of the center eye, 4 upon selection of the left middle eye, or 5 upon selection of the left eye.

Conversely, when the photographer holds the camera in the vertical posture, the photographer's forefinger is naturally put on the release button 4. Here, when the photographer lightly presses the release button 4, the flow branches from (5) to (16).

(16) To shift the value in the register EYE to OLDEYE. Since 0 was put in the register EYE at (3), 0 is set in OLDEYE at present.

(17) To determine if the switch SW10 is on. That is, it is determined if the right eye is selected through the distance measuring point selecting dial 6. If it is on, the flow branches to (18).

(18) To store 1 in the register EYE.

(19) Similarly, to branch to (20), when SW11 is on with selection of the right middle eye.

(20) To store 2 in the register EYE.

(21) To branch to (22), when SW12 is on with selection of the center eye.

(22) To store 3 in the register EYE.

(23) To branch to (24), when SW13 is on with selection of the left middle eye.

(24) To store 4 in the register EYE.

(25) To store 5 in the register EYE at (25) with selection of the left eye.

As described, a value selected by the distance measuring point selecting dial 6 is stored in the register EYE in such a manner that 1 is set upon selection of the right eye, 2 upon selection of the right middle eye, 3 upon selection of the center eye, 4 upon selection of the left middle eye, or 5 upon selection of the left eye.

As described, a distance measuring point operation member is selected depending upon the camera posture. That is, the distance measuring point selecting dial 5 is selected in the lateral posture but the distance measuring point selecting dial 6 is selected in the vertical posture.

(26) To compare the register EYE with OLDEYE. If they are different from each other, the flow goes to (27); if they are equal to each other, the flow branches to (28).

At this point OLDEYE is 0. Thus, the flow goes to (27), because EYE is different from OLDEYE.

(27) To clear the JF flag.

(29) To determine the present status of the automatic selection switch.

If the manual selection is selected the flow goes to (31); if the automatic selection is selected the flow branches to (30).

(30) To perform the automatic selection AF (autofocus). The details thereof will be described later.

(31) To perform the manual selection AF (autofocus). The details thereof will be described later.

After completion of AF, photometry operation of AE is performed at (32).

(33) To determine if the second stroke of release button is on.

If it is off the flow goes to (4); if it is on, the flow goes into an unrepresented release sequence from (34) to perform an exposure operation.

Returning to (4), setting of the register EYE is carried out if the first stroke of the release button is still on.

Since EYE and OLDEYE are equal to each other this time at (26), the flow branches to (28).

(28) To determine the present status of the focusing flag. Unless the camera is in focus, the flow goes to (29) to perform the AF operation. Once the camera becomes in focus, the flow goes from (28) directly to (32) so as not to repeat the AF operation.

However, if the photographer rotates the distance measuring point selecting dial while keeping the release button on, the position of the switch being on is changed so as to make the value of EYE different from the value of OLDEYE, and, therefore, the flow goes from (26) to (27) to clear the focusing flag JF, again calling the AF routine. In other words, the camera is so arranged that AF is again carried out with a change of distance measuring point even after completion of focusing.

Figure 4:
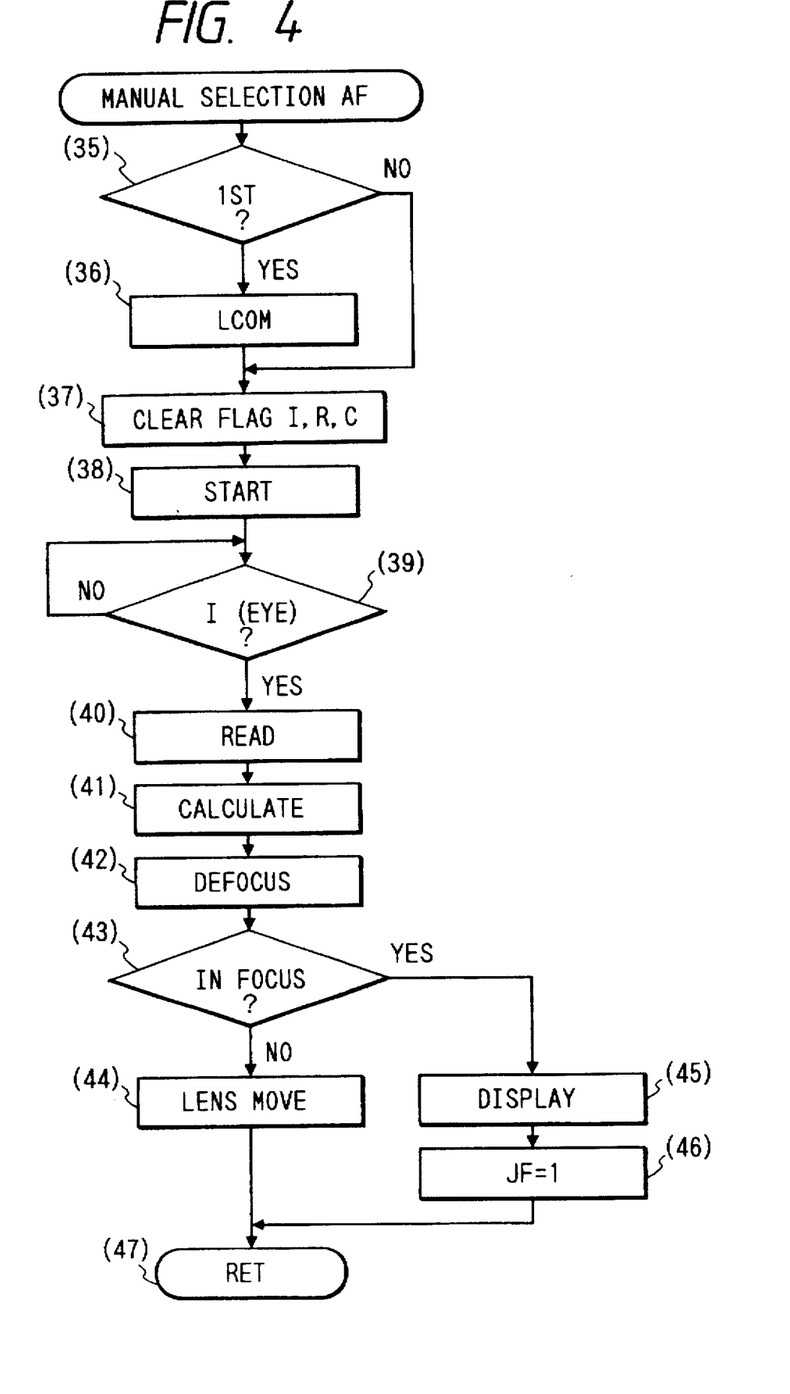
FIG. 4 is a flowchart of a manual selection subroutine in the first embodiment of the present invention.

Next described with FIG. 4 is the manual selection AF subroutine shown at (31) in FIG. 3.

(35) To determine if the operation of distance measurement (focus detection) is first. If the operation of distance measurement (focus detection) is first, the flow goes to (36); if not, the flow branches to (37).

(36) To perform communication with the lens to put lens information into the microcomputer. Information such as the focal length, the sensitivity coefficient, the comb tooth pitch, etc. is read from the lens.

(37) To clear status flags for the array of distance measuring points to initialize them. For the five distance measuring points (focus detection areas), there are provided storage end flags I(1), I(2), I(3), I(4), I(5), reading end flags R(1), R(2), R(3), R(4), R(5), and operation end flags C(1), C(2), C(3), C(4), C(5).

(38) To send a control signal to the distance measuring (focus detection) sensor to start sensor storage.

After completion of sensor storage, the sensor drive circuit SDR requests an interrupt, and then the interrupt is handled. With an interrupt, a sensor having finished the storage is given a corresponding storage end flag I to indicate the completion of storage.

(39) To wait for completion of storage of a sensor corresponding to a distance measuring point (focus detection area) selected by the register EYE.

(40) To read an output from the sensor after completion of storage in the selected sensor. Data is read while supplying a reading clock to the sensor and consecutively performing A/D conversion. After the A/D conversion, the data is subjected to correction calculation and obtained data is stored in the predetermined RAM.

(41) To calculate a prediction value of an image blur amount on the sensor by a correlation operation. The calculation of image blur amount is performed by a well-known method and a calculation result is stored in a predetermined RAM.

(42) To obtain a defocus amount of the lens from the thus obtained prediction value. A relation between the prediction value and the defocus amount is determined by optical parameters of the secondary optical system for focus detection and the taking lens.

(43) To determine if the defocus amount is within the in-focus range. If it is within the in-focus range, the flow goes to (45); if not, the flow branches to (44).

(44) To drive the lens in accordance with the defocus amount. After completion of the lens driving, the flow returns to the main routine at (47).

(45) To display the in-focus status, because the camera is in focus.

(46) To set the focusing flag JF and then to return to the main routine.

As described, AF can be executed at a selected distance measuring point (focus detection area).

Figure 5:
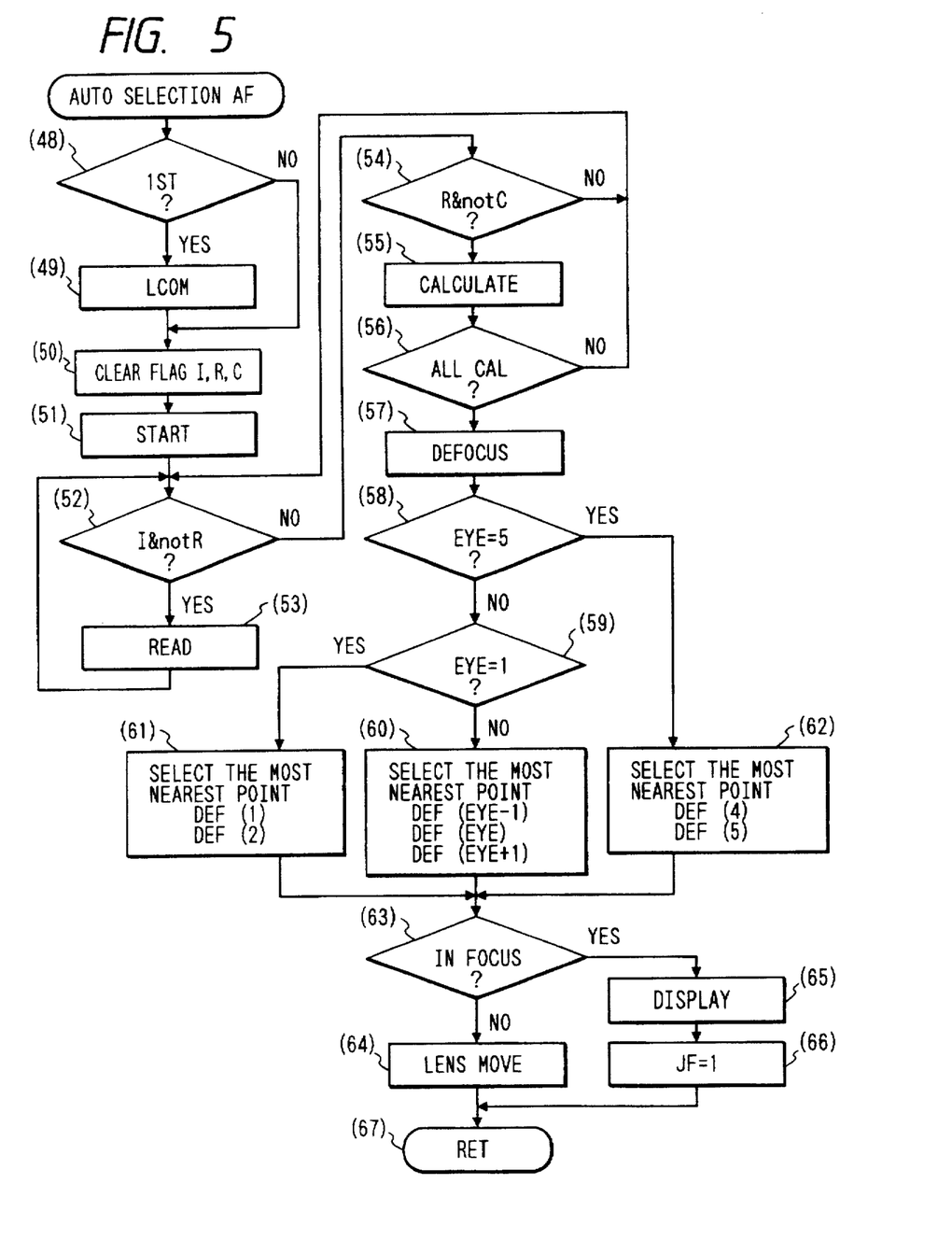
FIG. 5 is a flowchart of an automatic selection subroutine in the first embodiment of the present invention.

Next described with FIG. 5 is the automatic selection AF subroutine shown at (30) in FIG. 3.

(48) To determine if the operation of distance measurement (focus detection) is first. If the operation of distance measurement (focus detection) is first, the flow goes to (49); if not, the flow branches to (50).

(49) To perform communication with the lens to put lens information into the microcomputer. Information such as the focal length, the sensitivity coefficient, the comb tooth pitch, etc. is read from the lens.

(50) To clear status flags for the array of distance measuring points to initialize them. For the five distance measuring points (focus detection areas), there are provided storage end flags I(1), I(2), I(3), I(4), I(5), reading end flags R(1), R(2), R(3), R(4), R(5), and operation end flags C(1), C(2), C(3), C(4), C(5).

(51) To send a control signal to the distance measuring (focus detection) sensor to start sensor storage.

After completion of sensor storage, the sensor drive circuit SDR requests an interrupt, and then the interrupt is handled. With an interrupt, a sensor having finished the storage is given a corresponding storage end flag I to indicate the completion of storage.

(52) To check if there is a distance measuring (focus detection) area having finished the storage but having not been read. If there is a distance measuring (focus detection) area having finished the storage of the sensor but having not been read, the flow goes to (53); if the conditions are not satisfied the flow branches to (54).

(53) To read an output from the sensor. Data is read while supplying a reading clock to the sensor and consecutively performing the A/D conversion. After the A/D conversion, the data is subjected to correction calculation and obtained data is stored in a predetermined RAM. Then a corresponding reading end flag R is set for the distance measuring point (focus detection area) after completion of data reading, and then the flow returns to (52).

(54) To check if there is any area having finished but having not been subjected to the correlation operation. If there is data not subjected to the correlation operation after completion of reading, the flow branches to (55); if there is no such data the flow returns to (52).

(55) To calculate a prediction value of an image blur amount on the sensor by a correlation operation. The calculation of image blur amount is performed by a well-known method and a calculation result is stored in a predetermined RAM. After completion of the correlation operation, an operation end flag corresponding to the distance measuring point (focus detection area) is set.

(56) To determine if all distance measuring point operations are completed.

If all operation end flags are set, the operations of the five distance measuring points (focus detection areas) are finished. Thus, the flow branches to (57). If there is any distance measuring point (focus detection area) for which the operation has not been completed yet, the flow returns to (52).

(57) To obtain a defocus amount of the lens from the prediction value. A relation between the prediction value and the defocus amount is determined by optical parameters of the secondary optical system for focus detection and the taking lens. Defocus amounts for the distance measuring points (focus detection areas) 1 to 5 are set as DEF (1) to DEF (5).

(58) To branch to (62) if the selected distance measuring point (focus detection area) is the left eye.

(59) To branch to (61) if the selected distance measuring point (focus detection area) is the right eye.

The flow branches to (60) if the selected point is the left middle eye, the center eye, or the right middle eye, other than the above.

(60) To compare a defocus amount of the distance measuring point (focus detection area) selected by the distance measuring point selecting dial with that of the two distance measuring points (focus detection areas) adjacent thereto and to select a distance measuring point (focus detection area) having a nearest defocus (i.e., to determine a nearest object distance).

(61) To compare a defocus amount of the right distance measuring point (focus detection area) selected by the distance measuring point selecting dial with that of the right middle eye and to select a distance measuring point (focus detection area) having a nearest defocus amount.

(62) To compare a defocus amount of the left distance measuring point (focus detection area) selected by the distance measuring point selecting dial with that of the left middle eye and to select a distance measuring point (focus detection area) having a nearest defocus amount.

As described, for the automatic selection, the camera can be so arranged that the automatic selection of a distance measuring point is carried out around the distance measuring point (focus detection area) set through the distance measuring point selecting dial.

(63) To determine if the defocus amount is within the in-focus range. If it is within the in-focus range, the flow goes to (65); if not, the flow branches to (64).

(64) To drive the lens in accordance with the defocus amount. After completion of the drive, the flow returns to the main routine at (67).

(65) To display the in-focus status, because the camera is in focus.

(66) To set the focusing flag JF and then to return to the main routine.

As described, the automatic selection AF is carried out around the selected distance measuring point (focus detection area).

Figure 6:
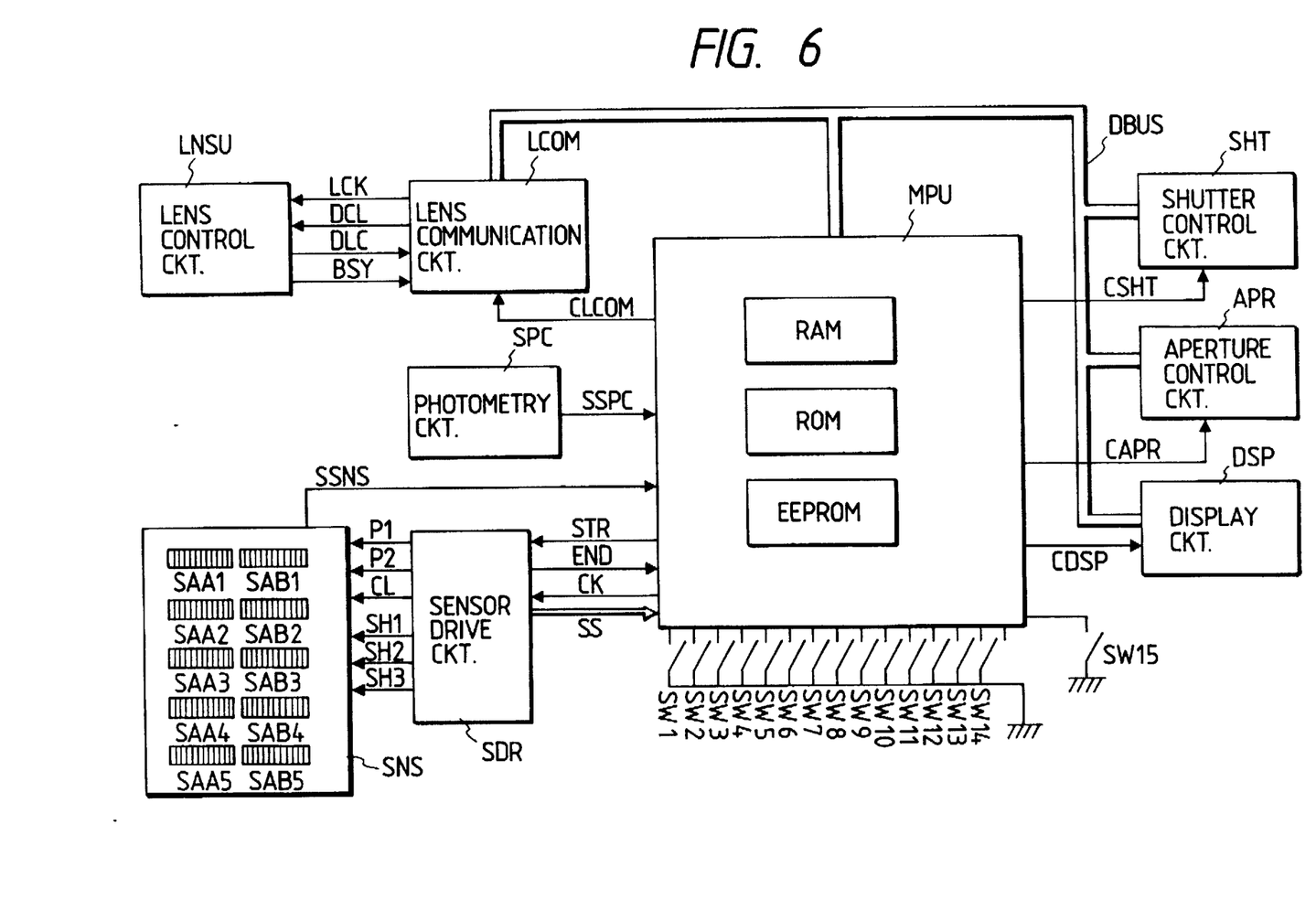
FIG. 6 is a circuit diagram of a second embodiment of the present invention.

FIG. 6 is a circuit diagram of the second embodiment of the present invention.

Figure 7:
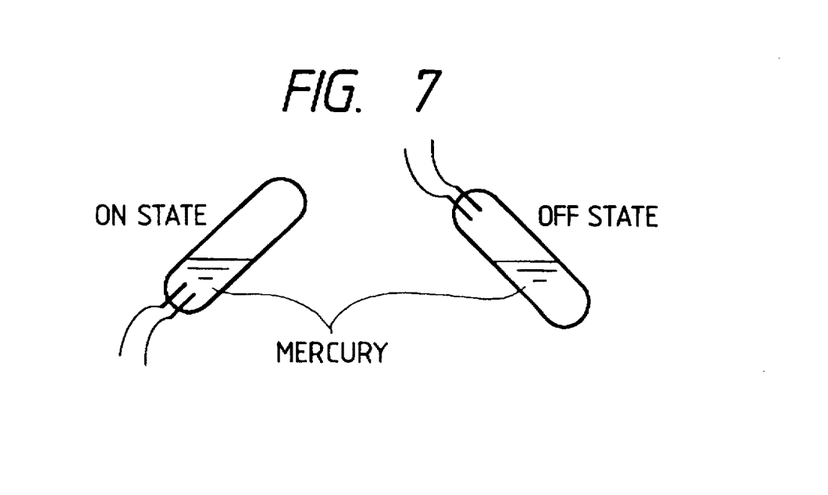
FIG. 7 is a drawing to show an appearance of a switch for detecting a holding state of camera.

Only portions different from FIG. 2 are described. SW15 is a switch for detecting whether the camera is held in the vertical posture or in the lateral posture, by using the direction of gravity. SW15 may be, for example, a switch as shown in FIG. 7, which is arranged to be turned on in the vertical posture but off in the lateral posture with movement of mercury sealed in a glass tube in accordance with the camera posture.

Figure 8:
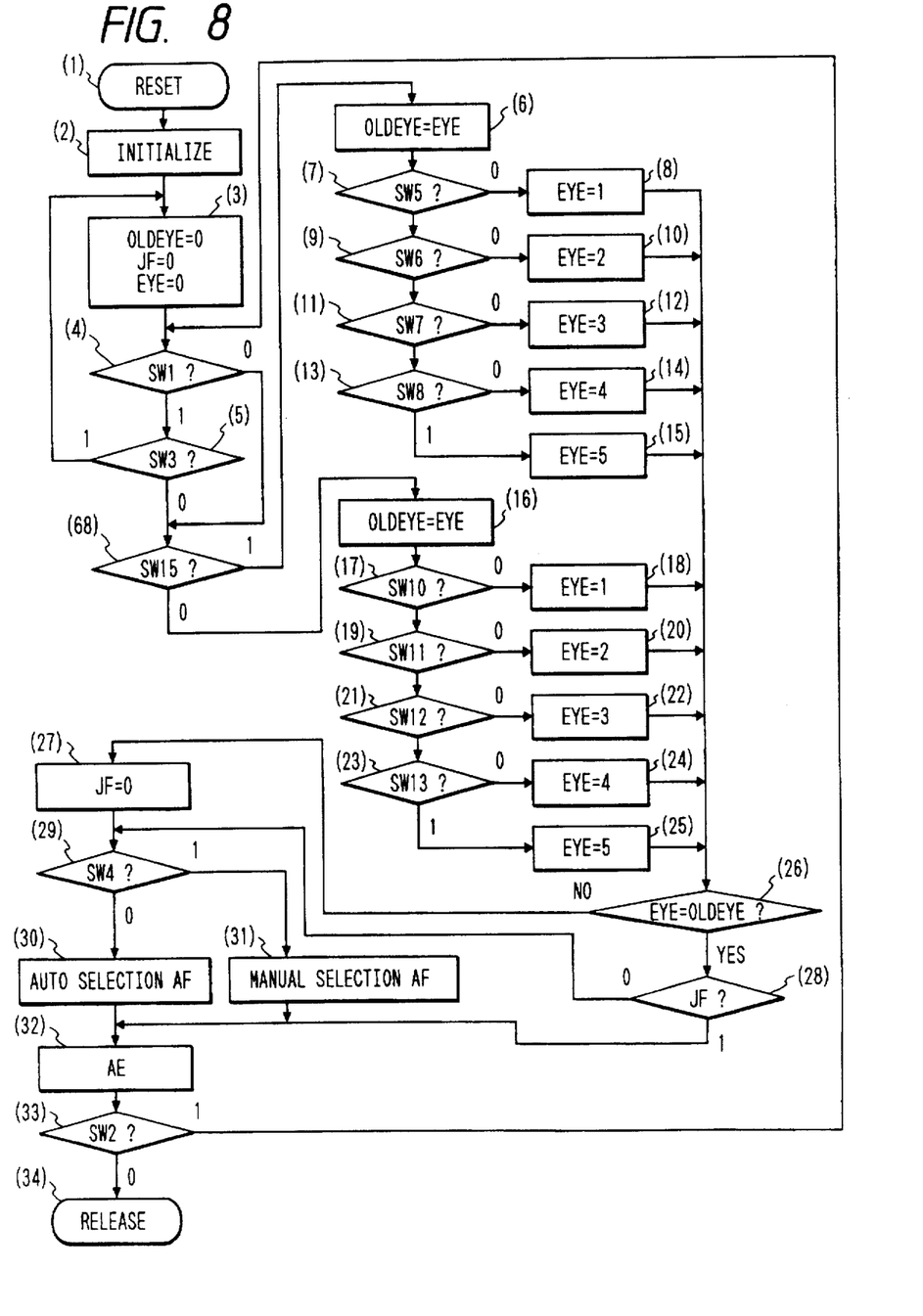
FIG. 8 is a flowchart of the second embodiment of the present invention.

FIG. 8 is a flowchart of the second embodiment of the present invention.

Only portions different from the first embodiment are described.

(4) If SW1 is off the flow goes to (5); if it is on the flow goes to (68).

(5) IF SW3 is off the flow goes to (3), performing no operation, similarly as in the first embodiment.

(68) If the status of the camera is in the vertical posture, the switch is on and the flow goes to (16) to select a distance measuring point (focus detection area) using the distance measuring point selecting member for vertical posture.

If the status of the camera is in the lateral posture, the switch is off and then the flow goes to (6) to select a distance measuring point (focus detection area) using the distance measuring point selecting member for lateral posture.

As described above, one of the distance measuring point selecting members can be selected depending upon the detected holding state of the camera.

The above embodiments show a focus detecting apparatus of the type in which the defocus amount is obtained as focus detection, but it is of course possible that the present invention is applied to focus detecting (distance measuring) apparatus of the type in which a distance to an object is obtained. It is noted that the selection operation members such as the above distance measuring point selecting dials do not always have to be set on the camera main body, but may be set in an auxiliary apparatus such as a grip apparatus mounted on the camera main body. In the specification of the present application, the camera means a state where the grip apparatus or the like is mounted on the camera main body so as to be incorporated therewith or a state only of the camera main body.

Also, the camera may be provided with detecting means for detecting, when a distance measuring area is selected through either the operation member for vertical posture or the operation member for lateral posture, which operation member is being controlled or which operation member has been controlled, which may be so arranged as to validate only setting information of one operation member as detected but to invalidate setting information of the other operation member.

Further, if one of the operation members is mechanically is in non-operation state in accordance with a holding state of the camera, the other operation member may be in an operation state.

What is claimed is:

1. A camera having (i) a processing circuit for determining a focus state or a distance to an object in at least one of a plurality of different areas of a scene, and (ii) a focusing circuit which performs focusing based on a processing result by said processing circuit for the at least one area, said camera comprising:

a first selection operation member disposed at a first position on the camera, for selecting any one of said plurality of different areas;

a second selection operation member for selecting any one of said plurality of different areas independently of said first selection operation member, said second selection operation member being disposed at a second position on the camera different from said first position;

a selection circuit for selecting either one of said first and second selection operation members; and a control circuit for invalidating an area selected by said second selection operation member and validating an area selected by said first selection operation member when said first selection circuit selects said first selection operation member, and for invalidating an area selected by said first selection operation member and validating an area selected by said selection operation member when said selection circuit selects said second selection operation member, wherein said first selection operation member is disposed on a substantially horizontal surface of the camera, and wherein said second selection operation member is disposed on a substantially vertical surface of the camera.

2. A camera having (i) a processing circuit for determining a focus state or a distance to an object in at least one of a plurality of different areas of a scene, and (ii) a focusing circuit which performs focusing based on a processing result by said processing circuit for the at least one area, said camera comprising:

a first selection operation member disposed at a first position on the camera, for selecting any one of said plurality of different areas;

a second selection operation member for selecting any one of said plurality of different areas independently of said first selection operation member, said second selection operation member being disposed at a second position on the camera different from said first position;

a selection circuit for selecting either one of said first and second selection operation members; and a control circuit for invalidating an area selected by said second selection operation member and validating an area selected by said first selection operation member when said first selection circuit selects said first selection operation member, and for invalidating an area selected by said first selection operation member and validating an area selected by said selection operation member when said selection circuit selects said second selection operation member, wherein said selection circuit detects the orientation of the camera and selects one of said selection operation members in accordance with the detection.

3. A camera according to claim 1, wherein said selection circuit detects the orientation of the camera and selects one of said selection operation members in accordance with the detection.

4. A camera according to claim 3, wherein said selection circuit detects whether the camera is oriented in a horizontal posture or in a vertical posture.

5. A camera having (i) a processing circuit for determining a focused state or a distance to an object in at least one of a plurality of different areas of a scene, and (ii) a focusing circuit which performs focusing based on a processing result by said processing circuit for the at least one area, said camera comprising:

a first selection operation member disposed at a first position on the camera, for selecting any one of said plurality of different areas;

a second selection operation member for selecting any one of said plurality of different areas independently of said first selection operation member, said second selection operation member being disposed at a second position on the camera different from said first position;

a first release operation member disposed at a position corresponding to the first position, said first release operation member operating said processing circuit in the first operation and operating a camera release in the second operation; and a second release operation member disposed at a position corresponding to the second position, said second release operation member operating said processing circuit in the first operation and operating a camera release in the second operation; and a control circuit for invalidating an area selected by said second selection operation member and validating the area selected by the first selection operation member when the first release operation member is being operated in the first position, and for invalidating an area selected by said first selection operation member and validating an area selected by said second selection operation member when said second release operation member is being operated in the first position.

6. A camera having (i) a processing circuit for determining a focused state or a distance to an object in at least one of a plurality of different areas of a scene, and (ii) a focusing circuit which performs focusing based on a processing result by said processing circuit for the at least one area, said camera comprising:

a first selection operation member disposed at a substantially horizontal surface of the camera, for selecting any one of said plurality of different areas;

a second selection operation member for selecting any one of said plurality of different areas independently of said first selection operation member, said second selection operation member being disposed at a substantially vertical surface of the camera different from a position of said first selection operation member;

a first release operation member disposed at a position corresponding to the first position, said first release operation member operating said processing circuit in the first operation and operating a camera release in the second operation;

a second release operation member disposed at a position corresponding to the second position, said second release operation member operating said processing circuit in the first operation and operating a camera release in the second operation; and a control circuit for invalidating an area selected by said second selection operation member and validating the area selected by the first selection operation member when the first release operation member is being operated in first operation, and for invalidating an area selected by said second selection operation member when said second release operation member is being operated in the first operation.

7. An area selection apparatus for use in a camera having (i) a processing circuit for determining a focus state or a distance to an object in at least one of a plurality of different areas, and (ii) an autofocus apparatus which performs focusing based on a processing result by said processing circuit for the at least one area, comprising:

a first selection operation member disposed at a first position on the camera, for selecting any one of said plurality of different areas;

a second selection operation member for selecting any one of said plurality of different areas independently of said first selection operation member, said second selection operation member being disposed at a second position on said camera different from said first position; and a control circuit for invalidating an area selected by said second selection operation member and validating an area selected by said first selection operation member when said first selection operation member is being operated, and for invalidating an area selected by said first selection operation member and validating an area selected by said second selection operation member when the second selection operation member is being operated, wherein said first operation member is disposed on a substantially horizontal surface of the camera, and said second operation member is disposed on a substantially vertical surface of the camera.

* * * * *

UNITED STATES PATENT AND TRADEMARK OFFICE
CERTIFICATE OF CORRECTION

PATENT NO. : 5,740,478

DATED : April 14, 1998

INVENTOR(S): RYUICHI KOBAYASHI

Page 1 of 2

It is certified that error appears in the above-identified patent and that said Letters Patent is hereby corrected as shown below:

COLUMN 3:
    line 59, "o" should read --to--.

COLUMN 9:
    line 11, "is in" should read --in a--;
    line 35, "first selection" should read --selection--;
    line 38, "said" should read --said second--; and
    line 66, "first selection" should read --selection--.

COLUMN 10:
    line 2, "said" should read --said second--;
    line 31, "the first" should read --a first-- and "in the" should read --in a--;
    line 36, "in the" should read --in a--;
    line 37, "in the" should read --in a--;
    line 42, "position," should read --operation,--;
    line 46, "position." should read --operation.--;
    line 53, "at a" should read --at a first position, on a--;
    line 60, "at a" should read --at a second position, on a--;

UNITED STATES PATENT AND TRADEMARK OFFICE
CERTIFICATE OF CORRECTION

PATENT NO. : 5,740,478

DATED : April 14, 1998

INVENTOR(S) : RYUICHI KOBAYASHI

It is certified that error appears in the above-identified patent and that said Letters Patent is hereby corrected as shown below:

```
COLUMN 10: (continued)
     line 61, "camera" should read --camera,--; and
     line 66, "the first" should read --in a-- and
"in the" should read --in a--.

COLUMN 11:
     line 4, "in the" should read --in a--;
     line 5, "in the" should read --in a--;
     line 10, "in" should read --in the--; and
     line 11, "said second" should read --said first
selection operation member and validating the area
selected by said second--.
```

Signed and Sealed this

Twenty-seventh Day of October, 1998

Attest:

BRUCE LEHMAN

*Attesting Officer*    *Commissioner of Patents and Trademarks*